US010505885B2

(12) United States Patent
Yuan

(10) Patent No.: US 10,505,885 B2
(45) Date of Patent: Dec. 10, 2019

(54) INTELLIGENT MESSAGING

(71) Applicant: LinkedIn Corporation, Mountain View, CA (US)

(72) Inventor: Lawrence Yuan, Campbell, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 14/938,317

(22) Filed: Nov. 11, 2015

(65) Prior Publication Data

US 2016/0255034 A1    Sep. 1, 2016

Related U.S. Application Data

(60) Provisional application No. 62/126,360, filed on Feb. 27, 2015.

(51) Int. Cl.
*G06F 15/16* (2006.01)
*H04L 12/58* (2006.01)
*H04L 29/08* (2006.01)

(52) U.S. Cl.
CPC .......... *H04L 51/32* (2013.01); *H04L 51/22* (2013.01); *H04L 67/306* (2013.01)

(58) Field of Classification Search
CPC ....... H04L 51/32; H04L 51/22; H04L 67/306; H04L 51/12
See application file for complete search history.

(56) References Cited

U.S. PATENT DOCUMENTS

| 10,185,776 | B2* | 1/2019 | Young | G06F 16/955 |
| 2011/0289011 | A1* | 11/2011 | Hull | G06Q 10/107 |
| | | | | 705/319 |
| 2012/0079045 | A1* | 3/2012 | Plotkin | H04L 51/12 |
| | | | | 709/206 |
| 2012/0117568 | A1* | 5/2012 | Plotkin | G06F 9/4843 |
| | | | | 718/100 |
| 2013/0041952 | A1* | 2/2013 | Silas | G06Q 10/10 |
| | | | | 709/204 |
| 2013/0097093 | A1* | 4/2013 | Kolber | G06Q 10/1053 |
| | | | | 705/321 |
| 2013/0097269 | A1* | 4/2013 | Plotkin | H04L 51/02 |
| | | | | 709/206 |
| 2013/0097270 | A1* | 4/2013 | Plotkin | H04M 1/72547 |
| | | | | 709/206 |

(Continued)

*Primary Examiner* — Yves Dalencourt
(74) *Attorney, Agent, or Firm* — Schwegman Lundberg & Woessner, P.A.

(57) ABSTRACT

Techniques for improved categorization, processing, and display of electronic messages such as email are described. According to various embodiments, it is determined that a recipient corresponding to a member of an online social networking service has received an electronic message from a sender. Member profile data of the sender and the recipient is then accessed. Thereafter, a professional importance score associated with the message is calculated, based on the accessed member profile data of the sender and the recipient. The message is then classified into one of a plurality of professional importance categories, based on the determined professional importance score, and the message is marked in a message inbox user interface associated with the recipient, based on the classification.

19 Claims, 6 Drawing Sheets

(56) References Cited

U.S. PATENT DOCUMENTS

2014/0129464 A1\* 5/2014 Grayevsky ......... G06Q 10/1053
 705/321
2014/0195549 A1\* 7/2014 Ahn ....................... H04L 51/32
 707/749
2014/0222702 A1\* 8/2014 Jennings ............ G06Q 30/0631
 705/319

\* cited by examiner

INTELLIGENT MESSAGING

TECHNICAL FIELD

The present application relates generally to data processing systems and, in one specific example, to techniques for improved management of electronic messages such as email.

BACKGROUND

Online social network services such as LinkedIn® feature a wide range of products that are offered to millions of members. Further, such online social network services typically send a very large number of emails to members, where such emails may include information describing news, updates, features, products, offers, etc., associated with the online social network service.

BRIEF DESCRIPTION OF THE DRAWINGS

Some embodiments are illustrated by way of example and not limitation in the figures of the accompanying drawings in which.

DETAILED DESCRIPTION

Example methods and systems for improved categorization, processing, and display of electronic messages such as email are described. In the following description, for purposes of explanation, numerous specific details are set forth in order to provide a thorough understanding of example embodiments. It will be evident, however, to one skilled in the art that the embodiments of the present disclosure may be practiced without these specific details.

Figure 1:
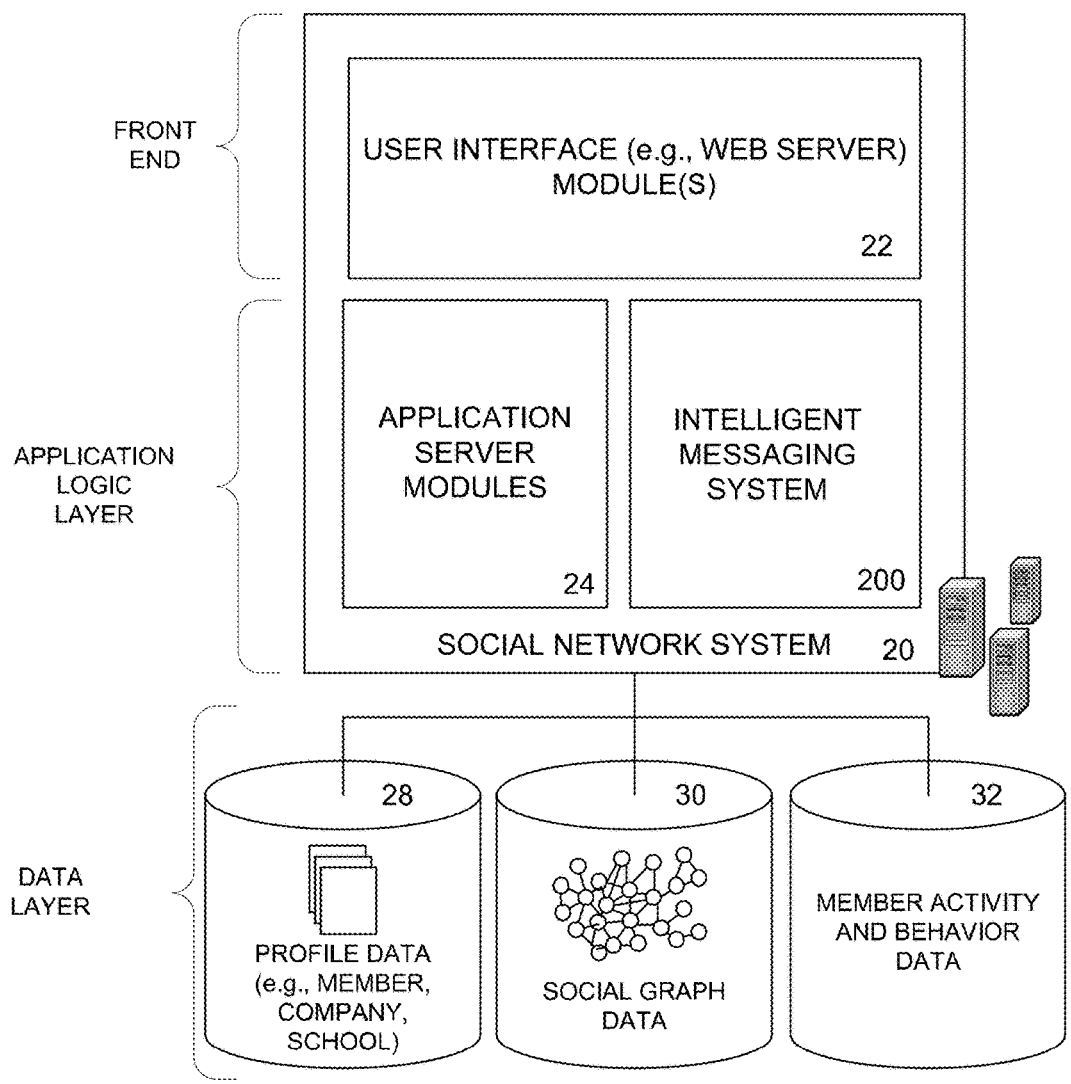
FIG. 1 is a block diagram showing the functional components of a social networking service, consistent with some embodiments of the present disclosure.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as an intelligent messaging system 200. The intelligent messaging system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
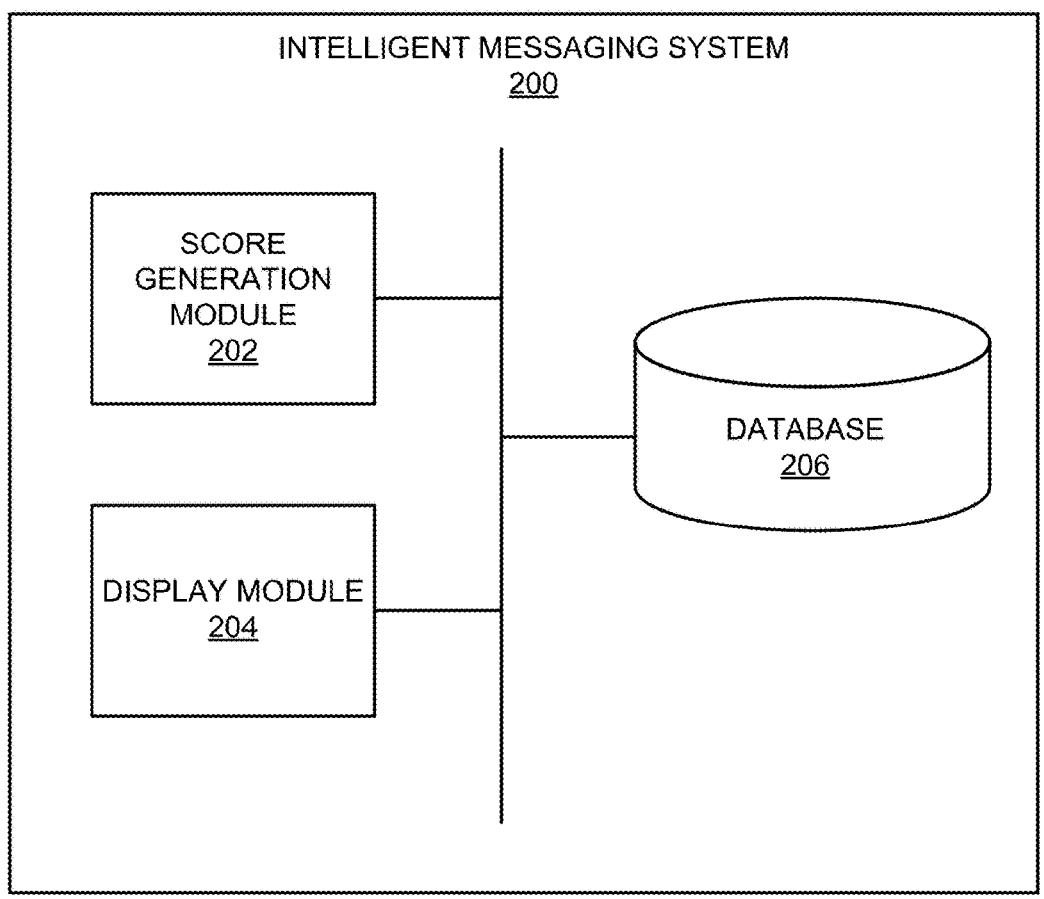
FIG. 2 is a block diagram of an example system, according to various embodiments.

Turning now to FIG. 2, an intelligent messaging system 200 includes a score generation module 202, a display module 204, and a database 206. The modules of the intelligent messaging system 200 may be implemented on or executed by a single device such as an intelligent messaging device, or on separate devices interconnected via a network. The aforementioned intelligent messaging device may be, for example, one or more client machines or application servers. The score generation module 202 is configured to calculate professional importance scores associated with messages, and the display module 204 is configured to adjust the display of these messages based on their calculated professional importance scores.

According to various example embodiments, the system 200 is configured to calculate a professional importance score of an electronic message, such as an electronic message (e.g., e-mail, text message, etc.) received by a user (e.g., member of an online social networking service such as LinkedIn®). The professional importance score may indicate the inferred importance of the message in advancing the recipient's professional or a career-related interests. For example, a higher professional importance score may indicate that the message is important to the professional interests of the recipient, and that the recipient should reply with more urgency. These messages will be visually displayed separately to help users easily find these messages. On the other hand, a low professional importance score may indicate that the message is less important and need not addressed immediately. If a message has a low professional importance score, the system 200 may move the message to a lower category or may filter the message entirely out of the recipient's inbox.

In some embodiments, messages in a user's inbox (e.g., messages received during a predetermined time interval) may be sorted and arranged based on their calculated professional importance scores. For example, messages with a higher professional importance score may be displayed higher in a list of messages than messages having a lower professional importance score. In some embodiments, the system 200 may associate messages into different groups, based on the professional importance scores associated with those messages. For example, the display module 204 may display the messages with the top X (e.g., 10) importance scores in one portion (e.g., window) of a user interface, the messages with the next X importance scores in another portion of the user interface, the messages with the lowest X importance scores in another portion of the user interface, and so on. As another example, in some embodiments, the display module 204 may display a set of messages having professional importance scores greater than or equal to a first predetermined threshold in one portion (e.g., window) of a user interface, whereas messages with professional importance scores higher than a second threshold and lower than the first threshold in another portion of the user interface, and so on.

Figure 3:
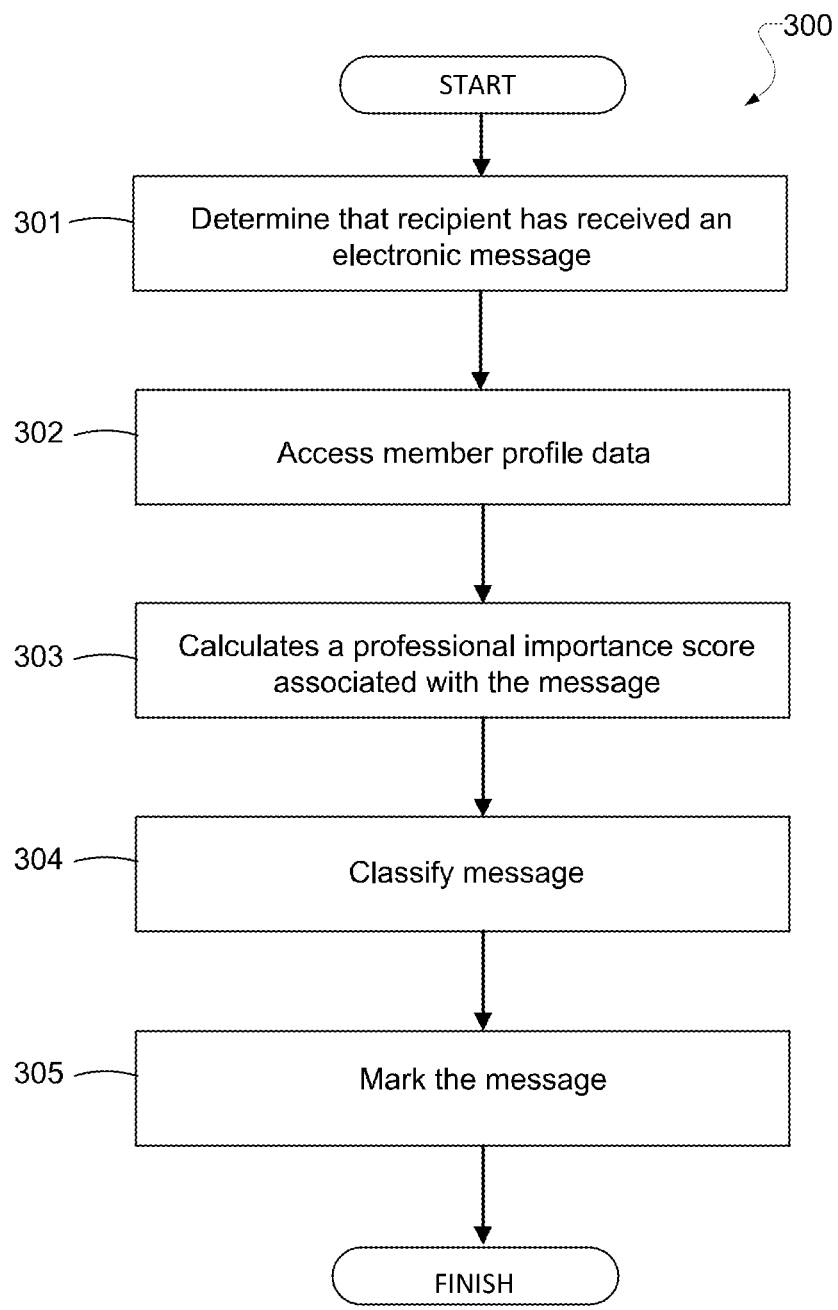
FIG. 3 is a flowchart illustrating an example method, according to various embodiments.

FIG. 3 is a flowchart illustrating an example method 300, consistent with various embodiments described herein. The method 300 may be performed at least in part by, for example, the intelligent messaging system 200 illustrated in FIG. 2 (or an apparatus having similar modules, such as one or more client machines or application servers). In operation 301, the score generation module 202 determines that a recipient corresponding to a member of an online social networking service has received an electronic message from a sender. In operation 302, the score generation module 202 accesses member profile data of the sender and the recipient described in operation 301. In operation 303, the score generation module 202 calculates, based on the member profile data of the sender and the recipient accessed in operation 302, a professional importance score associated with the message. In some embodiments, the professional importance score may correspond to a number in a range (e.g., 1 to 10, 0 to 100, etc.). Techniques for calculating the professional importance score associated with a message are described in more detail below. In operation 304, the score generation module 202 classifies the message into one of a plurality of professional importance categories, based on the professional importance score determined in operation 303. For example, if the professional importance score of the message is greater than a predetermined threshold, then the message may be classified as having "High professional importance", whereas if the professional importance score of the message is lower than a predetermined threshold, then the message may be classified as having "Low professional importance". In one example, where a range of the importance score is between 0 and 100, a predetermined threshold is 33. In this example, in response to the importance score being 33 or lower, the message is classified as having a "Low professional importance." In another example, where a range of the important scale is 0 to 10, a predetermined threshold is 8. In this example, in response to the importance score being 8 or higher, the message is classified as having a "High professional importance." Of course, other threshold values and ranges may be used and this disclosure is not limited in this regard.

Figure 4:
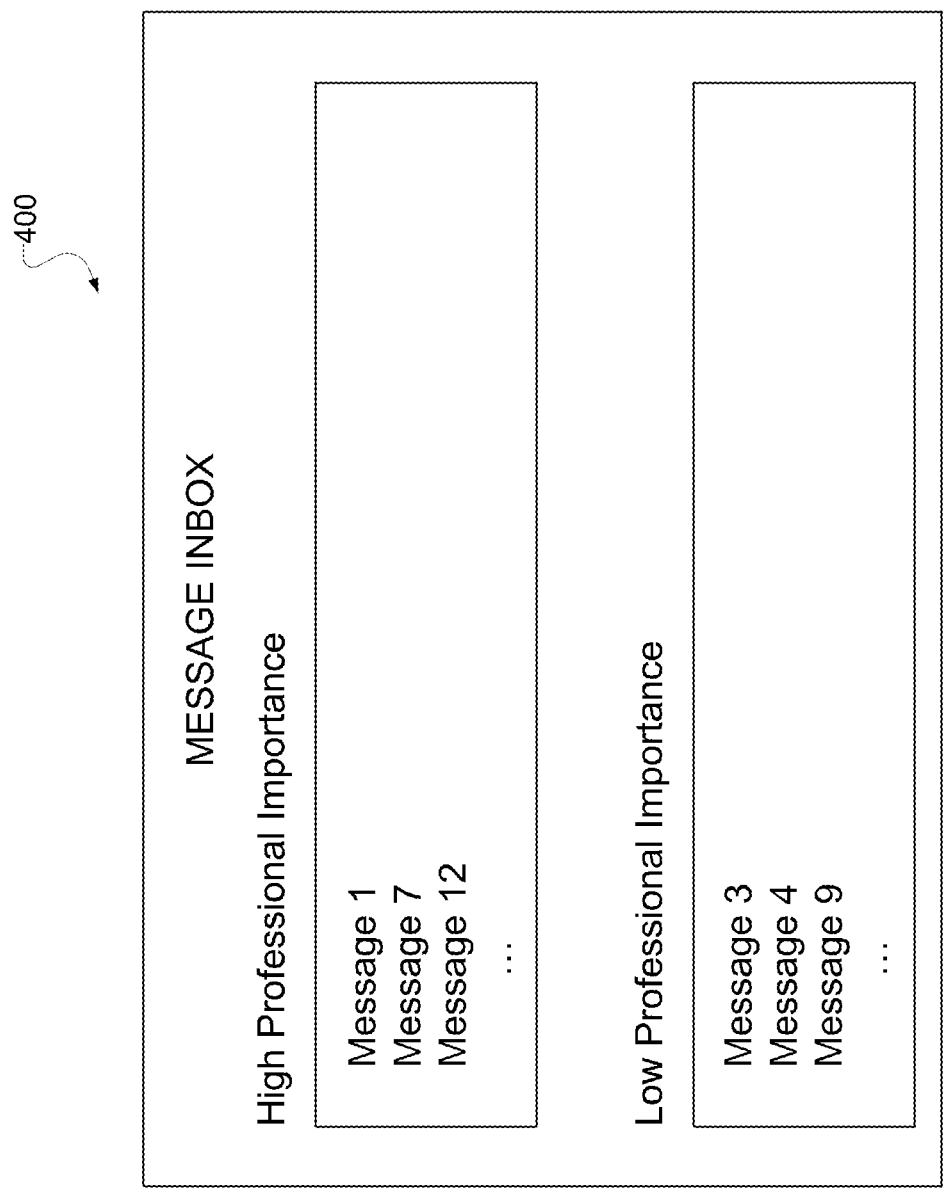
FIG. 4 illustrates an example portion of a user interface, according to various embodiments.

In operation 305, the display module 204 marks the message in a message inbox user interface associated with the recipient, based on the classification performed in operation 304. For example, if the message is classified as having "High professional importance", then the message may be placed in a message inbox user interface window labeled "High Professional Importance", whereas if the message is classified as having "Low professional importance", then the message may be placed in a message inbox user interface window labeled "Low Professional Importance", as illustrated in FIG. 4. It is contemplated that the operations of method 300 may incorporate any of the other features disclosed herein. Various operations in the method 300 may be omitted or rearranged.

In one example, the intelligent messaging system defines several categories corresponding to certain threshold ranges. Similarly, as with identifiers such as "High professional importance," and "Low professional importance," the intelligent messaging system may also label a message as "Medium professional importance," "No professional importance," "Entertainment," "Critical professional importance," or other, or the like.

In one example, the intelligent messaging system classifies messages into various categories based on the associated importance score. In one example, the intelligent messaging system classifies an importance score of 980-1000 as "Critical professional Importance," a score of 800 to 1000 as "High professional importance," a score of 200 to 800 as "Medium professional importance," a score of 20 to 200 as "Low professional importance," and a score of 0 to 20 as "No Professional importance." Of course, other ranges and values may be used and this disclosure is not limited in this regard.

In some embodiments, the score generation module 202 may leverage various data accessible by an online social networking service (e.g., LinkedIn®) in order to determine the professional importance score of a message. In some embodiments, the score generation module 202 may calculate the professional importance score of a message based on member profile data/attributes associated with the sender and/or the recipient of the message. For example, the more similar the member profile attributes of the sender and the recipient, the higher the professional importance score calculated by the score generation module 202. Examples of the member profile attributes include location, role, industry, language, current job, employer, experience, skills, education, school, endorsements, seniority level, company size, connections, connection count, account level, name, username, social media handle, email address, phone number, fax number, resume information, title, activities, group membership, images, photos, preferences, news, status, links or URLs on a profile page, and so forth.

In one example embodiment, the score generation module 202 determines a number of profile attributes that are common between the sender and the recipient and expresses the professional importance score as a percentage of similar attributes. In one example, the sender and the recipient have a common location, role, industry, language, and education, but do not have common preferences, seniority, level, company size and connections. In response, because the sender and the recipient share 5 of the 10 profile attributes, the score generation module 202 determines that the professional importance score is 5. In other embodiments, various profile attributes are weighted and the score generation module 202 determines the professional importance score according to the weights.

In some embodiments, the score generation module 202 may calculate the professional importance score of a message based on calendar data associated with the sender and/or the recipient of the message. For example, the score generation module 202 may analyze calendar data associated with the sender and/or the recipient (e.g., invitee information for meetings in meeting planning software), and if the score generation module 202 determines that the recipient had a previous meeting—or has an upcoming meeting—with the sender, then the message from the sender of may be associated with a higher professional importance score.

In some embodiments, the score generation module 202 may calculate the professional importance score of a message based on a connection strength associated with the sender and the recipient of the message. For example, the score generation module 202 may calculate the connection strength between the sender and recipient if they are members of an online social network service such as LinkedIn®, using any connection strength calculation techniques understood by those skilled in the art. For example, the connection strength may be calculated based on whether the sender and recipient are connected via the online social networking service, how many common connections they have on the online social networking service, and so on.

In some embodiments, the score generation module 202 may calculate the professional importance score of a message based on on-site activity (e.g., on a website associated with an online social network service such as LinkedIn®) by the recipient of the message. For example, if the score generation module 202 determines that John Smith is looking for a job because John Smith has been visiting a lot of job postings on an online social network service such as LinkedIn® that are associated with certain job posting attributes (e.g., job title, company, industry, required skills, etc.), and if the sender of the message has member profile attributes that match some of the job posting attributes (e.g., job title, company, industry, skills, etc.), then the professional importance score of the sender's message may be increased.

In some embodiments, the score generation module 202 may calculate the professional importance score of a message based on historical correspondence or prior interaction associated with the sender and the recipient of the message. For example, the greater the prior interaction between the sender and the recipient, the greater the professional importance score associated with the sender's message. The prior interactions between the sender and the recipient may be determined based on the amount of previous e-mails or other messages between the sender and the recipient, the amount of social activity signals (e.g., likes, comments, shares, etc.) submitted by the recipient with respect to content posted by the sender an online social network service, and so on.

In some embodiments, the score generation module 202 may calculate the professional importance score of a message based on a profile rank associated with the sender of the message. For example, the profile rank of a member profile may indicate the importance of the member, and may be determined based on a number of views, number of connections, Influencer status, job title (e.g., VP or executive), etc. If the profile rank of the sender indicates that they are an influential member of an online social networking service (e.g., VP or executive or influencer), then the score generation module 202 may assign a higher professional importance score to the message. As another example, the score generation module 202 may calculate a decision maker or influencer score associated with the sender that indicates a degree to which whether the sender is a decision maker or LinkedIn® Influencer, and the score generation module 202 may generate the professional importance score of the message accordingly.

The score generation module 202 may calculate a decision maker score or influencer score associated with members of an online social networking service using the techniques described in subsequent paragraphs.

The social networking system uses member interactions with other members and with the social networking system to identify which members of an organization are the most influential. In some example embodiments, the social networking system receives a request to identify which members in a plurality of members associated with a particular organization are the most influential. In some example embodiments, the request is sent from a member and in other examples, the request is automatically generated when a member loads a page from the social networking system. The social networking system generates an influencer score for each member in the plurality of members. In some example embodiments, the influence score is also known as a decision maker score and represents the likelihood that a particular member is a key decision maker in an organization.

The social networking system uses information stored about the interactions of members to identify one or more members who have influencer scores above a predetermined threshold (e.g., that are determined to be highly influential.) In some example embodiments, influencer scores are generated by combining several component scores. Potential component scores include, but are not limited to, a popularity score, an authority score, and a connectedness score.

In some example embodiments, a popularity score for a first member is generated based on the ratio between the number of unique members who view the first member's profile and the number of unique profiles the first member views. In some example embodiments, members with a higher ratio have a higher popularity score.

In some example embodiments, an authority score is determined based on a ratio of incoming messages and connection requests for a member to outgoing messages and connection requests. In general, a member that has more incoming messages than outgoing messages has a higher authority score within an organization than a member that does not.

A connectedness score is based on how a member fits into a social graph. If a particular member serves as a connection point for a large number of members, then that particular member will have a higher connectedness score than a member that does not serve as a connection point between many members.

The members are then ranked in order of their associated influencer score. The social networking system then selects one or more members based on the ranking. Based on the request, these selected members are returned to a client system for display to a member. In some example embodiments, the contact information or other contact means are also transmitted to the client system for display.

In addition to the various application server modules, the application logic layer includes an influencer score module and an activity analysis module. As illustrated in FIG. 1, with some implementations, the influencer score module is implemented as a service that operates in conjunction with various application server modules. For instance, any number of individual application server modules can invoke the functionality of the influencer score module to determine how influential a particular member is. However, with various alternative implementations, the influencer score module may be implemented as its own application server module such that it operates as a stand-alone application. With some implementations, the influencer score module includes or has an associated publicly available API that enables third-party applications to invoke the functionality of the influencer score module.

Generally, the influencer score module calculates an influencer score for one or more members of the social networking service. An influencer score is a representation of how influential a member of an organization is relative to other members of the organization. Thus, members with higher influencer scores are more likely to affect the outcome of decisions that the organization makes including how the organization spends some or all of its budget, what projects an organization takes on, who and when new people are hired, stands taken by the organization on social or political issues, and other decisions organizations make.

In some example embodiments, the influencer score is represented as a number. For example, an influencer score can be a value between 0 and 1.0, where scores closer to 1 have more influence and scores close to 0 have less influence. In other embodiments, influencer scores are organized into one or more discrete groups (e.g., "Highly influential," "Moderately influential," "Not influential"), and members are grouped into one of the discrete groups.

In some example embodiments influencer scores are generated by analyzing actions (or interactions) taken by the members of a social networking service through the service or through a third party service of some kind. The influencer score module stores many categories of information (e.g., classifiers) including messages, page views, connection invitations, replies, time spent interacting with the social networking system, and any other relevant data.

In some example embodiments the categories of information collected are very specific. For example, social networking system stores information describing not only that a message was sent or received by also information about the sender/receiver. Thus, the social networking system tracks the number of messages from a person in sales or in a human resources department. Additionally, the social networking system can track whether the interactions are from another member with a high influencer score. For example, a member with a profile page that is often visited by members with high influencer scores may get a higher influencer score than a member whose profile is visited slightly more often but by members with very low influencer scores.

In some example embodiments, the influencer score is made by combining one or more component scores into a single weighted score. In some example embodiments, component scores include, but are not limited to, a popularity score, an authority score, and a connectedness score. These component scores are then combined to form an overall influencer score. In some example embodiments, component scores may relate to specific functions in the organization. For example, a member may have a high influencer score in human resources, meaning that they have influence on the hiring of new people, but a relatively low influencer score in buying supplies. Thus, the aggregate influencer score is between the two values. However, some requests are only concerned with one aspect of the influencer score. So if a request specifies that the only component that is of interest is the buying of supplies, the buying supplies component of the influencer score is the only component considered for responding to that request.

A popularity score component reflects how much interest there is in a particular member. This can be measured in one or more ways. One potential tool for generating a popularity score for a respective member is to determine a ratio of unique members that view the respective member's profiles to the number of unique member profiles viewed by the respective member. For example, if 2000 unique members view the profile of Member A and Member A only views three unique profiles, Member A will have a relatively high popularity score. Conversely, if Member B's profile is only viewed by seven unique members and Member B views the profiles of 30 members, Member B's popularity score will be relatively low.

Members whose profiles are viewed at a significantly higher rate than they themselves visit other profiles are determined to have a higher popularity score. In some example embodiments, having profile views from members who have high popularity scores or influencer scores themselves can result in an increased popularity score.

In some example embodiments the popularity score can measure a more specific popularity level. For example, a popularity score within an organization can be measured by only considering profile views from and to other members of the organization. For example, member A may have a higher overall popularity score than member B, but if member A's profile is only rarely visited by members associated with Organization C (e.g., an employer), and member B's profile is frequently viewed by members associated with Organization C, then member B's popularity score within the organization will be higher.

An authority score component reflects the relative authority a member has within an organization. This can be measured in multiple ways. In some example embodiments, an authority score is measured by calculating the ratio of incoming messages or connection invitations to outgoing messages or connection invitations, with the idea being that members with a great deal of authority are often inundated with requests and they have to be selective in deciding which to respond to.

In some example embodiments, more specific authority scores can reflect authority within a particular field. For example, the influencer score module 124 can determine only the incoming and outgoing messages/requests from and to sales people. This will give an authority score within a sales context. Then a member is able to request a list of influencers with regard only to the sales component of an influence score and in return receive rankings that only take into account the sales component of the authority score while ignoring the overall authority scores.

A connectedness score component reflects the degree to which a member helps connect members of within an organization. A connectedness score component reflects the betweenness centrality of a given member. Betweenness centrality is a measure of the degree to which a respective member of the social networking system acts as part of the shortest path between two other members. For example, if a member has a lot of connections in a social graph, then it is more likely that they are part of the shortest chain between any two members.

Generally, the influencer score module calculates an influencer score for one or more members of the social networking service. An influencer score is a representation of how influential a member of an organization is relative to other members of the organization. Thus, members with higher influencer scores are more likely to affect the outcome of decisions that the organization makes including how the organization spends some or all of its budget, what projects an organization takes on, who and when new people are hired, stands taken by the organization on social or political issues, and other decisions organizations make.

The activity analysis module gathers, organizes, and analyzes data concerning the activities that members take through the social networking system 120. For example, the activity analysis module 126 tracks all messages, profile views, connection invitations, and any other interactions for each member of the social networking system through the system or via a third party system. The activity analysis module also records and analyzes information about the members that take these actions such that a page view from a member of a sales team is recorded different than a page view from a person seeking a job.

This information is all collected and analyzed to help the influencer score module generate influencer scores. When the social networking system receives a request for influencer information (e.g., the top five influencers in human resources at organization A), the activity analysis module is able to access only the relevant interaction information and send it to the influencer score module. The influencer score module then generates influence scores for a plurality of members.

The social networking system then sorts or orders the members based on the calculated influencer score and transmits the data to the requesting client system. One or more third-party servers connect to the social networking system through a communication network. A third party server may also include member activity data (e.g., the activity of members of the social networking system when they interact through a third party server.

The social networking system receives a request to rank a plurality of members of a social networking system based on the influence each of the plurality of members has. In some example embodiments, the request to rank includes a target organization, and the plurality of members are associated with the target organization. For example, if a member visits a webpage associated with an organization, the client system generates a request for a ranked list of influencers associated with that organization.

In some example embodiments, the request includes a specific number of requested members (e.g., the top three influencers), a minimum influencer score (e.g., every influencer with a score over the 0.75 if the influencer score is represented by a value between 0 and 1), or a top percentage of all influencers (the top 10% influencer scores). In other embodiments, the request includes a request for a specific type of influencer. For example, the request is from a job seeker who is interested in members who have a high influencer score in the area of hiring. In response, the social networking system specifically analyzes the members in an organization based on human resource or hiring interactions.

In some example embodiments, the social networking system selects one or more of the plurality of members included in the request to rank (e.g., employees of a specific company). For a respective member in the plurality of members of the social networking system, the social networking system analyzes member interactions of the respective member on the social networking system. Member interactions include any messages, invitations (e.g., to an event), connection requests (e.g., to be added to the member's social graph), profile views, web page hits, clicks, or other interaction with the social networking system or members of the social networking system. In some example embodiments, analyzing member interactions includes analyzing member interactions that take place through a third party system.

In some example embodiments, analyzing member interactions includes categorizing the interactions by when they occurred (more recent interactions are more important), what role the participants have with their respective organizations (e.g., a message from a salesman to a purchasing agent at another organization is categorized as a sales related message), the influencer score of each participant (e.g., receiving messages or profile views from a high influencer score member increases a member's own influencer score), and so on.

In some example embodiments, the social networking system records profile views of the member profile of the respective member of the social networking system and records profile view requests received from the respective member. For example, the social networking system stores, for at least one first member, every member profile that the first member visits. When all the data from many members is collected, the social networking system is able to identify patterns in members' profile viewing habits to identify members with popular profiles.

In some example embodiments, the social networking system records messages received by the respective member and messages sent by the respective member. For example, e-mails from one member to another are recorded. With enough data, the system can determine which members receive an outsized number of messages from other members and determine which members are popular or have authority (e.g., a supervisor likely receives more messages from subordinates than any one of the subordinates receives on their own).

In some example embodiments, the social networking system records connection requests received by the respective member and records connection requests sent by the respective member. A connection request is a request to be added to a member's social graph. Aggregating connection request data over time will help determine which members are popular (those that receive a large number of connection requests). In some example embodiments, the ratio of connection requests received to connection requests sent (or connection requests received to connection requests accepted) is used as a component in one or more of a popularity score, an authority score, and an influencer score.

The social networking system then generates an influencer score for the respective member based on the analysis of member interactions through the social networking system. In some example embodiments, generating an influencer score for the respective member based on the analysis of member interactions through the social networking system includes determining a ratio of unique profile views of the respective member's member profile to the number of profile view requests received from the respective member.

In one example embodiment, a method includes receiving a request to rank a plurality of members of a social networking system based on the influence each of the plurality of members has; for a respective member in the plurality of members of the social networking system: analyzing member interactions of the respective member on the social networking system; generating an influencer score for the respective member based on the analysis of member interactions through the social networking system; and ordering two or more members in the plurality of members of the social networking system based on the influencer scores associated with the two or more members.

In another example embodiment, analyzing member interactions of the respective member through the social networking system includes: recording profile views of the member profile of the respective member of the social networking system; and recording profile view requests received from the respective member. In one example embodiment, analyzing member interactions of the respective member through the social networking system includes: recording messages received by the respective member; and recording messages sent by the respective member.

In another example embodiment, analyzing member interactions of the respective member through the social networking system includes: recording connection requests received by the respective member; and recording connection requests sent by the respective member.

In one example embodiment, generating an influencer score for the respective member based on the analysis of member interactions through the social networking system includes: determining a ratio of unique profile views of the respective member's member profile to the number of profile view requests received from the respective member; and generating the influencer score at least partly based on the determined ratio.

In another example embodiment, generating an influencer score for the respective member based on the analysis of member interactions through the social networking system includes: determining a ratio of messages received by the respective member to messages sent by the respective member; and generating the influencer score at least partly based on the determined ratio.

In one example embodiment, generating an influencer score for the respective member based on the analysis of member interactions through the social networking system includes: determining a ratio of connection requests received by the respective member to connection requests sent by the respective member messages sent by the respective member; and generating the influencer score at least partly based on the determined ratio.

In another example embodiment, the request to rank includes a target organization and the plurality of members are associated with the target organization. In one embodiment, analyzing member interactions includes analyzing member interactions that take place through a third party system.

The score generation module 202 may provide for improved message handling in the context of job searching and recruiting. For example, the score generation module 202 may detect that member A has recently moved from Company A to LinkedIn® (e.g., based on a change in a company attribute in their member profile data), and may detect that Member B has been looking at LinkedIn® online job posting and/or submitted a job application to work at LinkedIn®. According, if member A sends a message to member B, the score generation module 202 may associated a high professional importance score with this message, and may even automatically recommend (e.g., via a prompt) that Member B reach out to Member A to start a conversation regarding job opportunities at LinkedIn®.

As another example, suppose the score generation module 202 determines that a recruiter member has posted a job posting, and has sent out numerous messages to potential candidates, and has received numerous response messages from the candidates. Based on the candidates' reputation, competitiveness for the new job, and likeliness to move to the new job, the score generation module 202 can highlight the messages from these candidates by assigning them a higher professional importance score. For example, the score generation module 202 may determine each candidates competitiveness for the new job based on their work history, past employers, based on how well their job title, skills, and endorsements match the job title and requisite skills for the new job, and based on how closely their member profile attributes match previous successful job applicants for the job and/or current holders of the job. In some embodiments, the score generation module 202 may determine each candidate's competitiveness for the new job by calculating a candidate fit score indicating a degree of a match between the candidate (the sender) and the job, and then generating the professional importance score of the message based on the candidate fit score of the sender. Techniques for generating a candidate fit score indicating a degree of a match between a candidate (e.g., a member of an online social networking service) and a job are described in the following paragraphs.

Candidate Fit Scores

The present technology is based on an approach in which a combination of information in a candidate's resume, a description of the job opening (the job description), and external data such as social media information about the candidate and salary information about the positions the candidate has held is utilized to inform a set of machine learning algorithms that match job openings to candidates by calculating a score, referred to herein as a suitability score. The result is a scoring function, a tool that combats inefficiency in the labor market by automatically and rapidly surfacing optimal candidates.

The suitability score serves both sides of the hiring process, both allowing candidates to find their optimal job, as well as employers to find their optimal candidates, and thereby engenders productivity in the successful employment of the most-suited individuals as well as efficiency in locating those individuals from among large applicant pools.

The suitability score emulates optimal human behavior and, being automated, can be calculated at any time in order to get the most qualified candidates hired.

The present disclosure provides for a computer-based method for identifying a best-fit candidate for a job opening, the method performed on at least one computer having a processor, a memory and input/output capability, the method comprising: receiving one or more resumes of one or more candidates; receiving one or more descriptions of job openings provided by one or more employers; identifying a plurality of job features in each of the descriptions of job openings; for each resume of the one or more resumes, identifying a plurality of candidate features in the resume; calculating a score for each of the one or more descriptions of job openings, wherein the score is based on a match between the plurality of candidate features in the resume and the plurality of job features in the description of the job opening; creating a first list of scores associated with each of the one or more descriptions; identifying for each of the one or more descriptions those resumes in the first list whose score exceeds a first threshold fit; and communicating a notification of a selected resume to an employer if the selected resume has a score that exceeds the first threshold fit for a description of a job opening provided by that employer.

The present disclosure includes a computer-based method for quantifying the suitability of a candidate for a job opening, the method comprising: accepting a resume of the candidate; extracting a plurality of candidate features from the resume; receiving a job description of the job opening from a prospective employer; extracting a plurality of job features from the job description; for each feature of the plurality of candidate features, obtaining a feature score by calculating an overlap between the candidate feature and a corresponding job feature; combining the feature scores for the resume into a suitability score for the job opening; and notifying one or both of the candidate or the prospective employer if the suitability score exceeds a first suitability threshold.

The present disclosure additionally includes a computer system for matching candidates to job openings, the system comprising: a first input connection that accepts a resume from a candidate; a second input connection that accepts a description of a job opening from an employer; a memory to store the resume and the description; one or more processors configured with instructions to: identify candidate features in the resume; identify job features in the description; calculate a score based on a match of candidate features with job features; a communication device for alerting the candidate if the score exceeds a first threshold; and a communication device for alerting the employer if the score exceeds a second threshold.

One or more candidate resumes are provided by one or more candidates to the computer system. A single candidate may provide more than one resume if that candidate wishes to tailor their expertise and experience towards different types of roles. A single candidate may also provide an updated resume at different points in time. The resumes 203 may be uploaded by the candidate or by a third party, for example, a recruiter. In one embodiment, a resume is filed via a web-based interface. In other embodiments, the candidate may create a resume on-the-fly by filling out a number of fields in one or more forms, such as by answering a questionnaire, in an online interface such as a web-browser.

The fields are designed to provide to the computer system sufficient information about the candidate that his or her suitability for a job opening can be assessed. In other embodiments, a combination of a prepared resume with an online form is used. For example, an online form may ask a number of questions of a candidate that are designed to create a profile for that candidate, which contains information not in, or easily deducible from, the candidate's resume. At this stage, a candidate may indicate that they are seeking work in areas that are not represented on their resume if, for example, they are attempting to make a career change. By indicating such additional areas of desired employment, the candidate may ensure that his or her resume is compared with job openings outside of the areas of expertise that are explicitly represented on the resume. The candidate may elect to create certain login attributes so that their resume and/or profile are stored and are accessible to them for further updates or when applying for subsequent job openings.

It is also possible that resumes are submitted to the system on behalf of candidates by third party services. One or more descriptions of job openings 201 are provided by one or more employers to a computer system. The descriptions of job openings 201 may be uploaded by, for example, a representative of the employer as files via a web-based interface. An employer may alternatively or additionally elect to input one or more job openings by answering an online questionnaire and by filling out fields in one or more forms via an online interface such as a web-browser. The fields are designed to provide to the computer system sufficient information about the job opening that the suitability of one or more candidates can be assessed. An employer who has many job openings and/or who expects to use the system frequently will probably establish a secure login, or develop a portal or application program interface (API) to the system in order to facilitate efficient upload of positions as they become available.

In some embodiments, the job descriptions can also be harvested from, e.g., one or more external databases of job openings. The descriptions of job openings and/or the candidate resumes are imported into the computer program via a direct link to some third party computer system or database. For example, the system may make a network connection to an employer or to a recruiter and access a remote repository of resumes or descriptions of job openings, and then upload a batch of those documents into the system. The documents may be retrieved and uploaded according to a set schedule, such as once daily, for example at 2 am, or once weekly, or once fortnightly, or once monthly.

In other embodiments, the computer system may receive one or sets of preferences for an employer, where the set of preferences for the employer contains at least one candidate feature required of any candidate who could be hired by that employer. In some embodiments, the set of preferences is not uploaded to the system by a third party such as the employer, but is determined by statistical analysis of previous decisions by that employer on candidates for other job openings with that employer.

For each description of a job opening that has been input into the system, the technology identifies a plurality of job features. This may happen immediately, upon entry of the description into the system, or it may happen as part of a batch process so that after some number, say 20, 50, or 100, of descriptions are input, each is parsed to extract certain job features that are present. A particular description of a job opening may not be parsed in this way if, for example, the employer who submits it asks for it to be held for a period of time or if, for example, the job description is itself not readable in whole or in part. In the latter case, the employer or third party submitter is notified to resubmit the description.

In a preferred embodiment, there is a confirmation step. After a job description is uploaded, certain keywords or skills are suggested to the submitter based on similar job descriptions submitted previously by that party. The employer can then explicitly rate the relative importance of these suggested skills. For example, the submitter is asked whether the suggested keywords should be deleted, whether the keywords correspond to attributes that are essential for the position, or whether they represent credentials that are just nice to have.

For each resume of the one or more resumes that has been input into the system, in conjunction with a profile for that candidate if available, the technology identifies a plurality of candidate features 210 in the resume and the profile, if present. This may happen immediately, upon entry of the resume into the system, or it may happen as part of a batch process so that after some number, say 20, 50, or 100, of resumes are input, each is parsed to extract certain candidate features that are present. Alternatively, it may be that the system runs parsing operations on newly submitted resumes at set time intervals, such as hourly or daily, and adjustable according to the amount of new user traffic to the site. A particular resume may not be parsed in this way if, for example, the candidate who submits it asks for it to be held for a period of time or if, for example, the resume is itself not readable in whole or in part. In the latter case, the candidate is notified to resubmit the resume and it is parsed at a later time.

Additionally, if a candidate has given permission to do so, the system may communicate with one or more Internet-based social networks of which the candidate is a member, and extract further data and information about the candidate and store that further data and information in connection with the candidate's resume. Such data can be referred to herein as "external data" because it is data that is not directly submitted by the candidate and is not contained within the candidate's resume. In some instances, the data may be obtained by accessing the candidate's account with the social network, in others, the data may be limited to that data which is publicly accessible, such as to persons who are not themselves members of the social network, or who have the required connections to the candidate within that social network. Examples of social networks that may provide such data include, but are not limited to: Facebook, LinkedIn, Twitter, Google+, MySpace, and Yahoo! Groups. The data obtained this way can include current and past employers of people who are connected to the candidate in their social network(s).

It is also possible for the system to access one or more other databases and retrieve external data relevant to the candidate's resume. For example, the system can extract the name of the school where the candidate obtained a bachelor's degree from the candidate's resume. From a separate database, the system can access the nationwide ranking of that school in the candidate's discipline, and add it to the candidate's profile, or use it as a feature in calculating a suitability score for the candidate.

It would be understood that there is no requirement that either step occurs before the other. In fact, both steps, in practice may be being carried out all the time, such as concurrently, so that candidates are continually accessing the computer system to upload resumes and review job openings, and employers are continually accessing the computer system to upload descriptions of new job openings. The suitability of a given candidate for those positions available at the time will be assessed. Correspondingly, a given job opening will be matched against those candidates available in the system at a given time.

The computer system then takes each resume that has been uploaded in turn and proceeds to calculate a suitability score (also, simply, a "score" herein) for each of the one or more descriptions of job openings that have also been accepted by the system, where the score is based on a match between the plurality of candidate features in the resume along with any features that have been extracted from the candidate's profile or social media or other external data, and the plurality of job features in the description of the job opening. Types of features of both candidate and job opening, and ways of quantifying the match between them in the form of a suitability score are described elsewhere herein.

The step of calculating a score for each resume relative to each description of a job opening could equally be viewed as the converse, considering each description in turn and calculating a score for each resume in the system. In total there would be as many as n×m calculations where n is the number of resumes, and m is the number of descriptions of job openings. This step can be intensive of computer processing power and therefore can be staged in a number of ways to improve efficiency. For example, it can be carried out at a set frequency, say once per 24 hours, or once per 48 hours, or once per week, over the whole database. It can be carried out in batches by, for example, considering a number of resumes, or a number of job openings, at a time. It can be carried out on one or more computers remote from the computer that has input and stored the resumes and descriptions of job openings so that processing power on the computer that accepts input from candidates and employers is freed up. Thus, a batch of descriptions of job openings could be transferred over a network to a remote computer. A single resume or batch of resumes are then transferred to the remote computer and suitability scores calculated for each resume-description pair. The scores are then transmitted back to the computer on which the resumes are stored. High scoring resume-job description pairs are identified and processed as described elsewhere herein. The remote computer or computers can be under the control of the same person or persons who control the computer that accepts the resumes and job descriptions. Alternatively, the remote computer or computers can be in "the cloud", such as owned by a third party but making processing power available to remote users.

In a preferred embodiment, each resume has an associated tag indicating a preferred job type for the candidate, so that, for each resume, the suitability score is only calculated for job descriptions that include a feature that matches the preferred job type. This represents a considerable cost saving in that not all resume-job description pairs need to be calculated. As a consequence, a candidate who has specified a particular job type will not see a list of possibly suitable job openings that do not match that type, even though, had their scores been calculated they might have been suitable positions for that candidate.

In another preferred embodiment, an employer has identified a candidate feature that, if present in a candidate's resume, will cause the resume for that candidate to be excluded from calculation of scores for a job opening submitted by that employer. For example, an employer may prefer its future employees not to have worked for a particular competitor. In an alternative embodiment, the employer has identified a candidate feature that, if absent from a candidate's resume, will cause the resume for that candidate to be excluded from calculation of scores for a job opening submitted by that employer. For example an employer may require all candidates for all of its job openings to have achieved a particular certification. Candidates who do not list that certification on their resumes and whose social network data do not reveal the existence of that certification will not have their scores calculated for job openings from that employer.

In yet another embodiment, each resume has an associated tag indicating an interest level that the candidate has in finding employment. Interest tags include descriptions such as "active", "interested", "qualified", or "inactive". The tag can therefore be a binary quantity (e.g., "interested" or "not interested"), or a graduated quantity, expressing a degree of interest in seeking employment. For each resume, a suitability score against the descriptions of job openings is only calculated for candidates whose interest level exceeds a particular interest threshold. Such a tag can be used to decide whether a candidate is actively job searching and therefore whether calculating a suitability score is appropriate. In some embodiments, a candidate's status of "active" can be downgraded to "inactive" if they have not logged on to the system for a set period of time, for example 30 days, 90 days, 180 days, or 1 year. In which case, the candidate's resume will stop being used to calculate suitability scores until such time as they log in again or indicate that they are interested again.

Therefore, the potentially large number (n×m) of calculations of suitability scores can be reduced significantly by judicious use of filters or tags, separately or in combination with one another.

A result of calculating the scores is a first list of suitability scores associated with each of the one or more job descriptions where each score in the first list corresponds to the match between a resume and that job description.

In a preferred embodiment, there is a first threshold suitability score below which a candidate whose resume has been scored against a description is deemed to be a poor fit for a given job opening. For example, if scores lie in the range [0, 100], a first threshold may be set by the system to be 75, 80, 85, or 90. The threshold may be adjusted upwards if there are a large number of high scoring candidates. An employer may choose a value for the first threshold so that they see more or fewer resumes at their discretion.

Additionally there may be, for each resume, a second list of suitability scores comprising one score associated with each of the one or more descriptions of job openings.

In a preferred embodiment, there is a second threshold score below which a job opening whose description has been scored against a resume is deemed to be a poor fit for a given candidate. For example, if scores lie in the range [0, 100], a second threshold may be set by the system to be 75, 80, 85, or 90. The threshold may be adjusted upwards if there are a large number of high scoring descriptions for that candidate's resume. A candidate may choose a value for the second threshold so that they see more or fewer descriptions of job openings.

The choice of range [0, 100] for the suitability score is purely for convenience. Other ranges, for example [0, 5], [0, 10], or [0, 1000], are consistent with the overall practice of the technology herein, which is not limited to the range of values encompassed by the score.

Where a first threshold score has been set, the computer system identifies 230 for each of the one or more descriptions of job openings those resumes in the first list whose score exceeds the first threshold fit, and flags those resumes as selected resumes.

The computer system then communicates 240 a notification of one or more selected resumes to an employer, or other third party submitter of the description, if a selected resume has a score that exceeds the first threshold fit for the description of a job opening provided by that employer. The notification can be communicated by any electronic means, including by e-mail, text message, FAX (facsimile), or some other automatically generated written notification. In one embodiment, the notification is a message stored on the computer system that the employer will see on their next login to the system. So the notification need not be a copy of the resume itself, but simply an indication that the employer or recruiter should access the system and view the resume and profile of a particular candidate.

Where a second threshold score has been set, the computer system identifies for each of the candidates one or more job openings whose descriptions are in the second list and whose score exceeds the second threshold fit, and flags those job descriptions as potential job openings for that candidate.

The computer system then communicates 260 a notification of one or more potential job openings to a candidate, if a description for that job opening has a score that exceeds the second threshold fit. The notification can be communicated by any electronic means, including by e-mail, text message, FAX (facsimile), or some other automatically generated written notification. In one embodiment, the notification is a message stored on the computer system that the candidate will see on their next login to the system. The notification to the candidate need not be a copy of the job description itself, but simply an indication that the candidate should access the system and view the description of a particular job opening.

It would be understood that there is no requirement that either step occurs before the other. In fact, both steps, in practice are being carried out according to the desires and preferences of candidates and employers or third party submitters. Accordingly, candidates may elect to receive notifications of job openings for which they have high scores at some frequency of their choosing. Correspondingly, employers may elect to instruct the computer system to notify them at certain frequencies of candidates who appear well suited to particular openings. An employer may elect to receive all notifications at the same specified frequently, for example, daily, weekly, bi-weekly, or monthly. Alternatively, an employer may set the frequency for each job opening, or according to category or level of job opening, as need and urgency dictates. In either case, an employer or candidate can elect to have, respectively, a resume or job opening sent to them at any time if the score for that resume-description combination exceeds an alert threshold.

It is also true that the system may be installed in a location where only employers or recruiters are seeking information, in which case the only data that is presented is the list of suitable candidates for a given position. Conversely, the system may be set up in such a way that it exclusively provides services to candidates, in which case the only data that is presented to a given candidate is the list of possible job openings for which that candidate is suitable.

In some embodiments, there is an additional, preferred threshold fit that is higher than either the first or the second threshold fits. For example, it may be set to 95 or higher, on a score range of [0, 100], where the first threshold fit was set to be a lower number such as 80, 95, or 90. When the score for the match of a candidate's resume to a job description exceeds the preferred threshold fit, an immediate notification can be sent to either the candidate or the employer or both. Such an immediate notification would be one that would be outside of the normal frequency of notification that either candidate or employer customarily received. By enabling such a possibility, both a candidate and an employer can, independently, potentially be on notice of a rare event of a very high scoring match.

Whenever an employer is provided with a list of candidates whose suitability scores exceed a first or a second threshold, the employer is able to review the candidates' resumes, profiles, and any other available data, and make a decision on whether to invite one or more of the candidates to formally apply for the job opening, or to come straight to an interview.

In an alternative embodiment, an employer can request that scores are calculated for candidates who have already applied for a job opening, for example by communicating their resumes to the system in conjunction with a description of the job opening.

Correspondingly, whenever a candidate receives a list of job openings whose suitability scores exceed a first or a second threshold, the candidate can review the descriptions of the job openings, and make a decision on whether to apply for the job opening and/or to send their resume directly to the employer or third party submitter.

In this way, by pairing up candidates who have a high likelihood of being suitable for a given job opening, the chances of those candidates securing a job interview are thereby enhanced. The suitability score cannot provide a direct indication of the likelihood of a candidate being actually hired into a position or, correspondingly, that the employer will actually fill a job opening with one of the possibly suitable candidates. Nevertheless, winnowing down a large field of candidates to a small number who would make good interview prospects will be of value to many employers who currently have to rely on making sure that their listings are visible in the right locations but must also rely somewhat on chance that the best-suited candidates will surface. Correspondingly, candidates who today are faced with a daunting task of reviewing hundreds of job openings and having little quantifiable prospect of reaching an interview in any of them, will find the process of identifying that small number of positions for which they are best suited to have a positive impact on their job searches.

Accordingly, one economic model that may make sense for the technology herein is one in which employers pay to access information about candidates who are well-suited, according to a suitability score, for a particular job opening. Payment schedules can include periodic, e.g., monthly, subscriptions, or pay-per-use models.

The suitability score, S, is a composite quantity made up of contributions from various features that are found in descriptions of job openings, in candidate resumes, and in various external data, such as may be obtained from social media. In a manner akin to how a FICO score quantifies a person's credit risk, the suitability score quantifies a candidate's viability, but for a particular position, and will greatly accelerate employers' ability to identify and hire the most elite and qualified candidates. In the same way, it will also help job seekers to immediately find job openings best suited to their experience, qualifications, and skill sets.

Once a candidate's resume and a description of a job opening are input into the system, a number (say 50) of parallel processes can be run to calculate a list of features such as those defined in Table 1 herein. The data is transmitted back to the originating process and assembled into a list that comprises, for each defined feature a numerical value. This is a vector of values. The ranges of the various values that correspond to good-fit and bad-fit resumes are generally known. The suitability score is computed from a mathematical function that takes the vector of values and outputs a single number. The overall value of this final formula is heavily influenced by the discriminating power of good-match features. A normalization can be achieved by, for example, dividing by the total possible length of feature space.

In certain embodiments, the values of certain individual features are examined, after a suitability score has been calculated. For example, for a certain employer or category of employer, values of certain scores can be used to apply penalties to candidates. This is another way of filtering out certain resumes from reaching an employer.

A feature, from which S is composed, is defined as a function that takes a single resume, from a candidate, and a single description of a job opening, and returns a numeric value, or null if the feature cannot be calculated. In some embodiments, the contributions of the various features to the suitability score have been derived from a statistical analysis of human-judged matches between resumes and job openings. Some features rely upon simple matching between the job description and resume (e.g., skills), whereas other more sophisticated features employ synonym sets to identify similar terms that may not be known outside an area of expertise. For example, a job description for a software programmer requiring knowledge of Java may be suitably filled by a candidate who lists j2ee on their resume. Other, even more sophisticated features examined historical relationships for important resume characteristics (e.g., prior employer, school attended, subject area of major, previous job titles) across the resume database. For example, it can be gleaned that Disney often hires people from state schools while the insurance company AllState prefers university graduates.

Other possible features include matching managerial qualifications to manager level job openings, deducing secondary information from industry taxonomies; inverse document frequencies based upon in-house resume and job description corpuses; quantifying gaps in employment or frequency of job-hopping; whether an applicant is overqualified; previous versus current salary expectations; career trajectory; company prestige; whether an applicant previously worked for a competitor of the potential employer; required and desired skills; certifications; school rank; education timeline; several different semantic relationships between the resume and job description; resume and job description spectral density; level of social activity (for example, number of first-level connections in a social network); company connections (for example, how many people in the candidate's social network work at the same company as listing the job opening); social network size; personality traits; cognitive profile; unique analysis of data from the Bureau of Labor and Statistics and many other available sources; SIC codes; SEO, etc. Thus, in addition to the job description and resume, many additional external data sources are utilized for each suitability score calculation.

Before the suitability score can be calculated, a plurality of job features is extracted from the description for a given job opening. Additionally, a plurality of candidate features is extracted from a resume of a candidate.

A feature score $F_i(u,j)$ for a candidate (user) u and a job j, is calculated. For each feature that is found in both the resume and the description, an overlap between the candidate feature and the corresponding job feature is calculated, thereby creating a feature score for that feature. Other features also contribute to the suitability score, but via metrics other than a simple overlap. For example, a piece of external data for a candidate may contribute to the suitability score even though that piece of data is not also found within a job description.

A suitability score for a candidate against the job opening is created by combining each of the feature scores for which an overlap has been calculated, along with feature scores for other features that have been determined to be relevant.

In some embodiments, the suitability score is calculated according to a non-linear superposition of feature scores, as further described elsewhere herein.

Typical features amongst the plurality of candidate features, extracted from a candidate's resume, include, but are not limited to: job title for each of one or more jobs previously held by the candidate; length of time the candidate held each of one or more previous jobs; subject matter of each of one or more qualifications obtained by the candidate; job title of most recent job held by candidate; whether the candidate has previously held a management position; highest educational level attained by candidate; and number of commonly misspelled words in the candidate's resume. Other features, drawn from external data, include: ranking of school attended.

An extended list of features that can be considered when computing a suitability score. In one example, all of the features are calculated as cosine similarities or sums of cosine similarities. When comparing a portion of the description of the job opening with a portion of a candidate's resume, the cosine similarity is calculated as the vector cosine of the word vectors formed after stop-word removal. Each cosine similarity takes a value between 0 and 1. During parsing of a job description or resume, common words (such as "the", "an", "a", "and") are identified and removed. These words are often called "stop words". The remaining words, or "non-common" words or "tokens", are considered further in the analysis. Also, during parsing, tokenizing is the process of identifying non-stop words in a sentence. Usually a space or item of punctuation is taken to be the delimiter used in identifying tokens. Some special strings, however, such as e-mail addresses and phone numbers, are not split in this way.

The suitability score can also be based on features that utilize social media data and other sources of aggregate data mined from the web and public databases. Examples are shown in Tables 1H and 1J. An important example is salary information. One hypothesis is that if a candidate's recent salary is similar to the salary for the job opening to which they are applying, the candidate is more likely to be qualified for that position. Typically a candidate is not asked for their salary when their profile is created or their resume is uploaded, nor do job listings typically specify the salary range for the position. To estimate a candidate's salary, a commercial salary database (e.g., from www.salary.com) can be utilized, as well as public salary survey information from the Bureau of Labor Statistics. Since job titles on resumes are not normalized, the best tf-idf match between the candidate's recent job history and the job titles available from salary surveys can be used to estimate salary ranges. The same matching technique can be used to estimate the salary for a job opening, if the salary is not posted with the description of the job opening, and if a candidate has a high enough suitability score for the job.

A feature score, F, for a given feature can be calculated according to a metric selected from the group consisting of (but not limited to): cosine overlap; Tanimoto coefficient; Jaccard coefficient; Dice coefficient; and Tversky index. Generally, as described elsewhere herein, some features lend themselves to being normalized in the range [0, 1], whereas others may be binary quantities, and still other features may not have an upper bound.

Typically, a suitability score, S, is a number between 0 and 100, though other normalization schemes could be used, such as a number between 0 and 10, and a number between 0 and 1,000. It is also possible that a scoring system could be un-normalized, and simply be expressed as a number proportional to the goodness of fit between a resume and a description of a job opening, in which case the larger the number (with no upper bound) the more suited is a candidate for a job opening.

Typically, when calculating a suitability score, each feature score is weighted by a coefficient derived from a statistical analysis of sample resumes and sample job descriptions, whose matches to one another have been ranked by individuals whose primary profession is recruiting. A study that is the basis of such a statistical analysis is described in Example 1 herein.

One method of deriving a weighting coefficient used to determine the contribution of a feature score to the suitability score is to: obtain a t-statistic estimated discriminating power for the feature. This can be done by comparing the feature score to a probability distribution function for that feature obtained for a set of resumes that have been ranked by individuals whose primary profession is recruiting, thereby determining whether the feature is a quantity that indicates a good match between the candidate and the job opening. If the feature is such a quantity, a weight can be applied to the feature based on the discriminating power. If the feature is not such a quantity, it will typically still play a role in the certain types of matches because features that do not have discriminating power for typical resume-job pairs stay in the calculation of suitability score, and may be important or some employers. For example, it is possible to adapt the form of the suitability score for different employers. Features such as misspellings (typographical errors) in candidates' resumes may be unimportant to some employers, but may be very relevant to hiring considerations of other employers or categories of employers. The mathematical framework for calculating a suitability score for all candidate job opening pairs can also be utilized to derive a customized score for a specific employer. In this way, the development of a suitability score can be, and preferably is, a dynamic process. The scoring function can be updated for a particular employer as and when its preferences become known.

Another way of deriving a weighting coefficient for a feature is to analyze data from a large scale comparison of resumes to job openings using a method selected from machine learning; neural networks and other multi-layer perceptrons; support vector machines; principal components analysis; Bayesian classifiers; Fisher Discriminants; Linear Discriminants; Maximum Likelihood Estimation; Least squares estimation; Logistic Regressions; Gaussian Mixture Models; Genetic Algorithms; Simulated Annealing; Decision Trees; Projective Likelihood; k-Nearest Neighbor; Function Discriminant Analysis; Predictive Learning via Rule Ensembles; Natural Language Processing, State Machines; Rule Systems; Probabilistic Models; Expectation-Maximization; and Hidden and maximum entropy Markov models. Each of these methods can assess the relevance of a given feature of a resume for purposes of suitability for a job opening, and provide a quantitative weighting of each.

A schematic that illustrates, without mathematical detail, an assembly of a suitability score is shown in FIG. 3. Various feature scores based on a candidate's resume, the job description, or an overlap of the two are calculated. For example, such feature scores could be based on: a calculated overlap of a resume word or property and a job description word or property 301; a calculated score for a piece of external data such as a ranking of an educational institution 303; a calculated score for a piece of data about the candidate obtained from social media 305; and a calculated score for an aspect of the candidate's resume such as its word count 307.

Each of the respective feature scores is then weighted, with a factor based on a probabilistic analysis of the importance of that feature. The probabilistic analysis is, as described elsewhere herein, based on a large-scale evaluation of many resume-job opening pairs. Feature scores are weighted according to how likely the value of the score for that feature is to lead to the candidate being considered a match for the job opening. The weighted feature scores are summed, thereby creating an overall suitability score.

The suitability score, S, can preferably be assembled in the following way. For a candidate u and a job j, we calculate feature scores $F_i(u,j)$, where $i=1-N$, and N is the number of features calculated. The calculation of feature scores can be as described for each of the features.

Based on (candidate, job) pairs where a match score Q has already been determined by a human evaluation, Probability Distribution Functions can be created: $P_i(Q\ 1\ F_i)$ is the probability that the match score is Q given a feature value $F_j$.

In the simplest example, the grading data allows two possible scores, a match (Q=1) and a non-match (Q=0). A match means the person is a good fit for the job, and a non-match means the person is not deemed, by the human grader, to be a good fit for the job. For example, if a feature is educational level attained by the candidate, and the match with a job opening is 1 (from a binary consideration), then $P_i(Q\ 1\ F_i)$ might be a single-valued function having a value of 70%, meaning that if a candidate has the right level of education for the position, the chance of them being judged suitable for the position is 70%.

Thus, for a two value situation, such as educational level, the student's two sample t-statistic, $t_i$, can be calculated for each such feature based on the data from the human-graded study.

For an unknown candidate job pairing, a suitability score, $S(u,j)$ for a candidate u and job description j, can then be calculated according to the following pseudo-code:

```
function Suitability_Score(u,j):
    maxscore = 0
    pairscore = 0
    for i in 1, N:
        fval = Fi(u, j)
        maxscore = maxscore + ti
        if Pi(1 I fval) > Pi(O I fval):
            pairscore = pairscore + ti
    return pairscore/maxscore
```

In this pseudo-code, the return value of the function is the suitability score, S, for candidate u and job j. In turn, S is the ratio of the pairscore and the maxscore. Each of those quantities is obtained by summing over each of the N contributing features. The quantity maxscore is the sum of the t-statistics for each of the contributing features. The quantity pairscore is the sum of those t-statistics for each of the contributing features where its probability of contributing is positive as measured by its probability distribution function.

In other words, if a given feature value is mostly likely to come from the matched candidate-job sample, then a weight equal to the discriminating power t of that feature is added. The score, S, is normalized to the sum of the discriminating powers t. The fitting of real-time data to a probability distribution, per feature, achieves a normalization of each feature value before it is combined into the suitability score.

It should be understood, therefore, that the contribution of a particular feature score to an overall suitability score can change as more data on resume-job opening matching is obtained and evaluated.

Furthermore, the algorithms for calculating a suitability score can be further improved by use of several different filters depending upon the requirement of the job, the qualifications of the candidate, or by terms of the search that the candidate or employer performs. For example, if a candidate is a certified nurse practitioner and desires a job within that field, the first-level filter will find jobs that require this certification or a synonym of it (e.g., LNP). These filters are bidirectional and thus can be utilized by candidate or employer. The suitability score is calculated by a machine-learning, data-driven relevancy algorithm that calculates the viability of a specific candidate for a particular job opening.

The final calculation of a suitability score consists of a novel fusion of machine learning and statistics. Utilizing explicit feedback data from HIRES, normalized probability distribution functions for the different HIRES scores were derived for each feature. As a new resume job pairing is scored in real time, results of the feature calculations are modeled against these functions utilizing a supervised Bayesian classifier approach, and a difference in fit is determined for each feature. This fit result is then binarized and weighted by a combination of the t-value and Pearson's coefficient derived from the feature values and HIRES study. The result is then normalized, so that the distribution of scores is moved from the range of raw values to a more convenient range such as [0, 100], and can be further weighted based upon certain specific constituents of the feature results (e.g., if the person holds the required certifications). The resulting score quantifies the viability of a candidate-job pairing.

A key component of the suitability score is the utilization of external data such as social media profiles and other publicly available data to enhance the information that is solely available in the job description and resume. This additional data can take many forms, including: information found in the user's Facebook or Linked In profiles, social connections, a curated database of company information, user-generated reviews of companies, salary surveys, scraped data from the web, and historical profiling among aggregated resumes. There is a substantial increase in the ability to discriminate qualified from non-qualified candidates by using public sources of social networking data.

In order to assess the discriminating power of each individual feature, a separate batch calculation was run for each feature, from which the t-statistic was calculated. This serves as an ostensible weighting coefficient for that feature's numerical contribution to the total suitability score. The mean value and standard deviation were also calculated for each feature for the resume job pairs deemed "at least minimally qualified" by the HIRES study, and, separately, those that were deemed "not minimally qualified". The various calculated means and standard deviations were used to parameterize respective probability distribution functions for "minimally qualified" and "not minimally qualified" resume job pairs. In this way, it was possible to determine the likelihood that a resume is qualified or not for a job opening based solely on that feature value. If a feature value for a given resume-job pair fits the probability distribution for the "minimally qualified" curve best, then the proportional value of the t-statistic for that feature (relative to the sum of the t-statistics for features calculated for the specific job-candidate pair) is added to their suitability score; otherwise, nothing is added. By starting with an appropriately low value, and adding all of the t-statistics of features for which a resume-job pair scored "well" according to the probability distribution functions for each feature, it is possible to reach a value that correlates directly to how qualified a candidate is for that job.

In another example embodiment, a method includes receiving one or more resumes of one or more candidates, receiving one or more descriptions of job openings provided by one or more employers, identifying a plurality of job features in each of the descriptions of job openings, for each resume of the one or more resumes, identifying a plurality of candidate features in the resume, calculating a score for each of the one or more descriptions of job openings, wherein the score is based on a match between the plurality of candidate features in the resume and the plurality of job features in the description of the job opening, creating a first list of scores associated with each of the one or more descriptions, identifying for each of the one or more descriptions those resumes in the first list whose score exceeds a first threshold fit, and communicating a notification of a selected resume to an employer if the selected resume has a score that exceeds the first threshold fit for a description of a job opening provided by that employer.

In another example embodiment, the method further includes creating a second list of scores associated with each of the one or more resumes, identifying for each of the one or more resumes those descriptions in the second list whose score exceeds a second threshold fit, and communicating a notification of a description of a job opening to each candidate whose resume has a score that exceeds the second threshold fit for that job opening.

In one example, each resume has an associated tag indicating a preferred job type for the candidate, and wherein for each resume the score is only calculated for job descriptions that match the preferred job type. In another example, an employer has identified a candidate feature that, if present in or absent from a candidate's resume, will cause the resume for that candidate to be excluded from calculation of scores.

In another example, the communicating a notification is carried out at a frequency chosen by the employer. In one example, the frequency is selected from: once per day; once per week; and once per month. In another example, the communicating a notification is carried out by sending an e-mail message or a text message. In one example, identifying for each of the one or more descriptions those resumes in the first list whose score exceeds a preferred threshold fit, wherein the preferred threshold fit is higher than the first threshold fit; and communicating an immediate notification of a selected resume to an employer if the selected resume has a score that exceeds the preferred threshold fit for a description of a job opening provided by that employer.

In another example, each resume has an associated tag indicating an interest level for the candidate, and wherein for each resume the score is only calculated for candidates whose interest level exceeds an interest threshold. In one example, a method includes receiving one or more profiles of one or more candidates, wherein a profile for a candidate contains at least one candidate feature in addition to the candidate features in the candidate's resume; and wherein the score is based on a match between the plurality of candidate features obtained from the candidate's resume and the candidate's profile, and the plurality of job features in the description of the job opening.

In one example, the method also includes receiving one or sets of preferences of one or more employers, wherein a set of preferences for an employer contains at least one candidate feature in addition to the plurality of job features; and wherein the score is based on a match between the plurality of candidate features obtained from the candidate's resume and at least one candidate feature in the set of preferences for the employer, and the plurality of job features in the description of the job opening.

In another example, the set of preferences for an employer is determined by statistical analysis of previous employer decisions on candidates for other job openings. In one example, the method is performed on two or more computers, wherein: the one or more resumes and the one or more descriptions of job openings are stored on a first computer; the identifying a plurality of job features and the identifying a plurality of candidate features are carried out on the first computer; prior to calculating a score for each resume, and the plurality of job features for each of the descriptions are transmitted to one or more remote computers via a network connection; the plurality of candidate features in each resume are transmitted to the one or more remote computers via a network connection; the calculating a score is carried out on the one or more remote computers; the first lists of scores for each of the descriptions are transmitted back to the first computer.

The score generation module 202 may provide for improved message handling in the context of sales. For example, suppose the score generation module 202 determines that a sales member has sent a number of messages to potential leads. The score generation module 202 may prioritize replies from these leads to the sales member based on scale of deal and how close they are to closing the deal. For example, if the monetary amount of the deal is large (based on textual analysis of monetary amounts listed in the replies), the score generation module 202 may determine that this reply should have a higher professional importance score. Further, if a thread has been a long on-going conversation (as determined by the date of the first message in the conversation), the score generation module 202 may determine that it is more likely to be further along in the deal and more likely to close.

The score generation module 202 may provide for improved message handling in the context of business. For example, the score generation module 202 may utilize sender seniority (based on member profile data of the sender) and the People You May Know (PYMK) product of LinkedIn® (which indicates closeness of connection between the sender and the recipient) to rank the importance of messages.

In some embodiments, the messages described herein may be any type of electronic message, including an e-mail, text message (e.g., a short messaging service (SMS) message, a multimedia messaging service (MMS) message, etc.), an instant message associated with an online social network (e.g., Facebook®, LinkedIn®, Wechat®, WhatsApp®, etc.), a chat message associated with an online chat service, and so on.

Example Mobile Device

Figure 5:
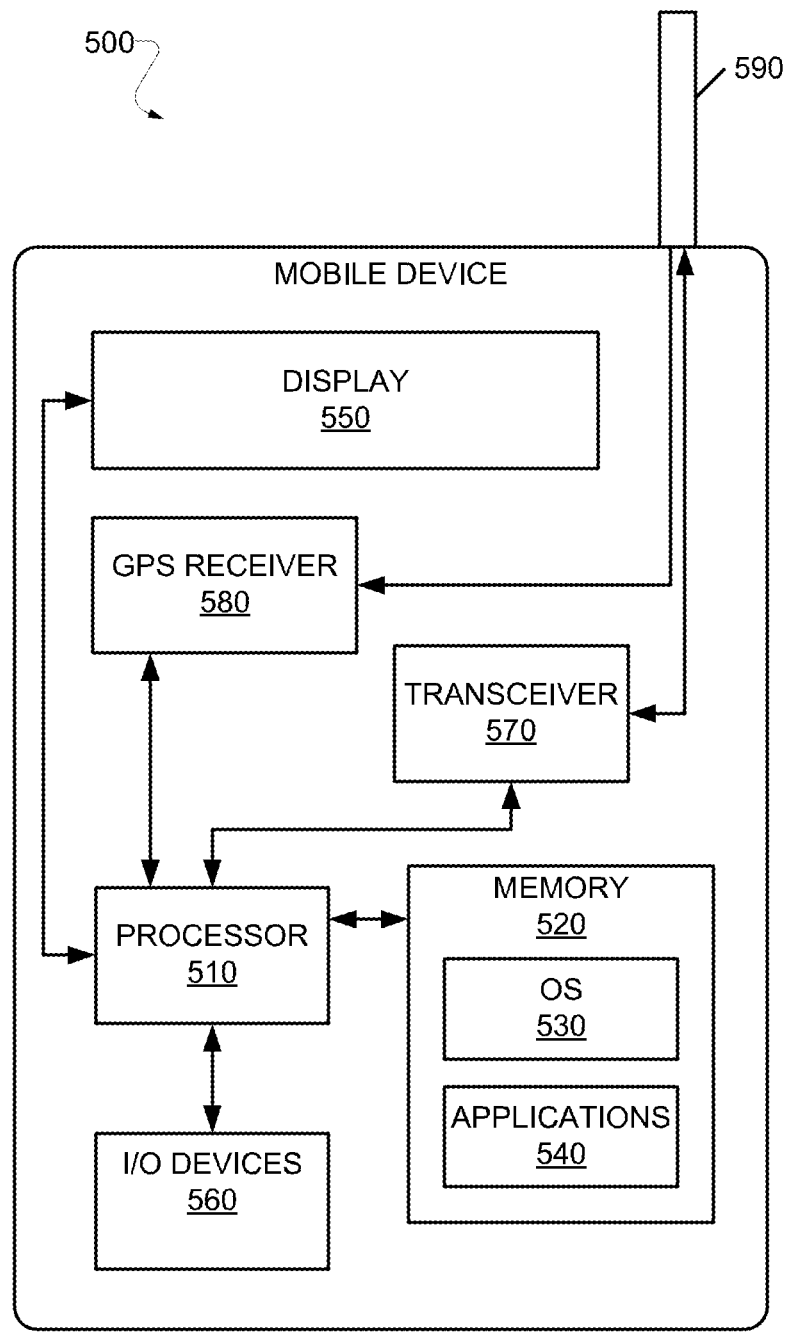
FIG. 5 illustrates an example mobile device, according to various embodiments.

FIG. 5 is a block diagram illustrating the mobile device 500, according to an example embodiment. The mobile device may correspond to, for example, one or more client machines or application servers. One or more of the modules of the system 200 illustrated in FIG. 2 may be implemented on or executed by the mobile device 500. The mobile device 500 may include a processor 510. The processor 510 may be any of a variety of different types of commercially available processors suitable for mobile devices (for example, an XScale architecture microprocessor, a Microprocessor without Interlocked Pipeline Stages (MIPS) architecture processor, or another type of processor). A memory 520, such as a Random Access Memory (RAM), a Flash memory, or other type of memory, is typically accessible to the processor 510. The memory 520 may be adapted to store an operating system (OS) 530, as well as application programs 540, such as a mobile location enabled application that may provide location based services to a user. The processor 510 may be coupled, either directly or via appropriate intermediary hardware, to a display 550 and to one or more input/output (I/O) devices 560, such as a keypad, a touch panel sensor, a microphone, and the like. Similarly, in some embodiments, the processor 510 may be coupled to a transceiver 570 that interfaces with an antenna 590. The transceiver 570 may be configured to both transmit and receive cellular network signals, wireless data signals, or other types of signals via the antenna 590, depending on the nature of the mobile device 500. Further, in some configurations, a GPS receiver 580 may also make use of the antenna 590 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
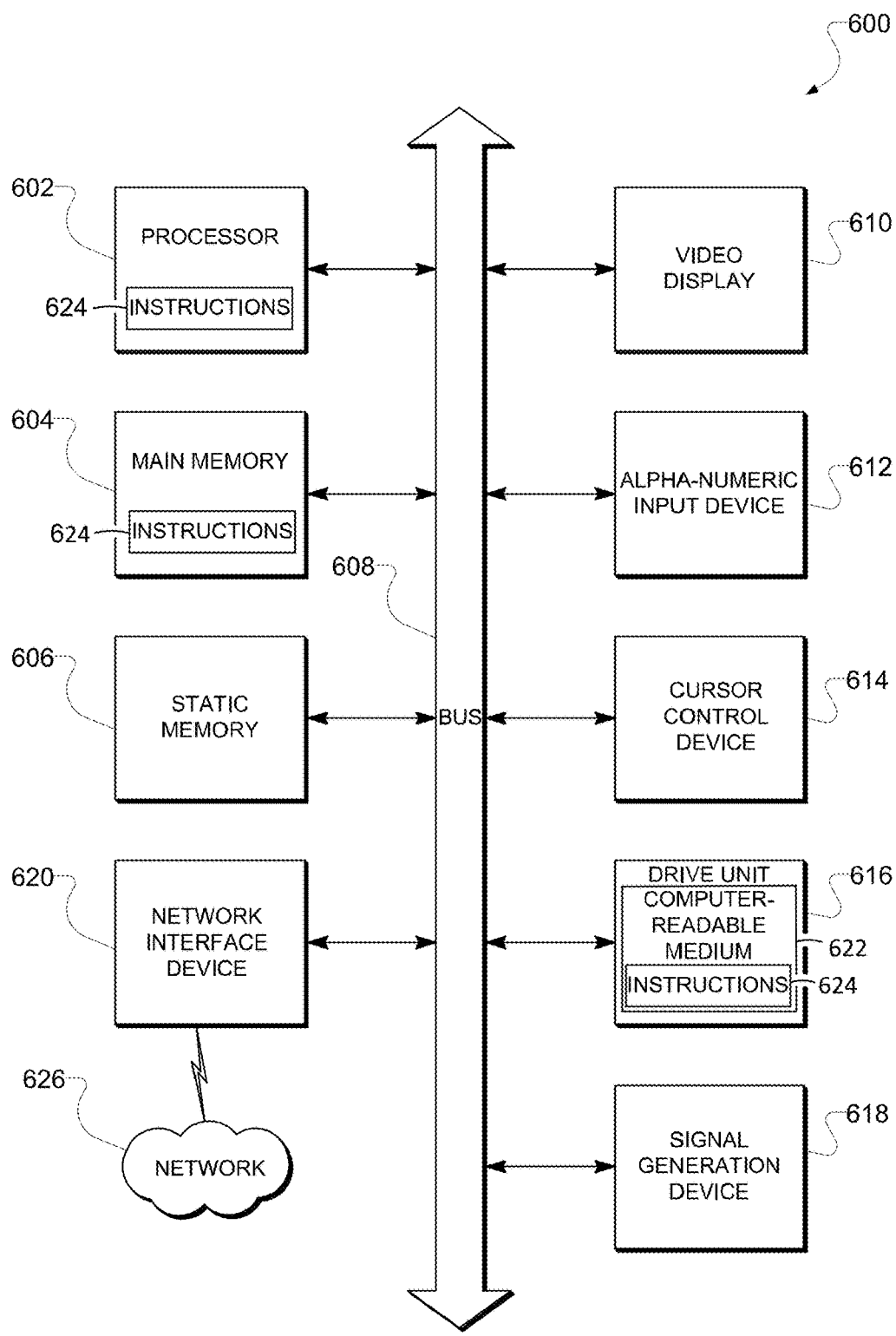
FIG. 6 is a diagrammatic representation of a machine in the example form of a computer system within which a set of instructions, for causing the machine to perform any one or more of the methodologies discussed herein, may be executed.

FIG. 6 is a block diagram of machine in the example form of a computer system 600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard or a touch-sensitive display screen), a user interface (UI) navigation device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining that a recipient corresponding to a member of an online social networking service has received an electronic message from a sender;
   accessing member profile data of the sender and the recipient;
   calculating, based on the accessed member profile data of the sender and the recipient, a professional importance score associated with the message, the calculating comprises:
      accessing calendar data of a meeting planning software, the calendar data being associated with the sender or the recipient;
      determining that there has been a previous meeting or that there is an upcoming meeting between the sender and the recipient based on the accessed calendar data; and
      generating the professional importance score associated with the message based on the determining that there has been the previous meeting or that there is the upcoming meeting between the sender and the recipient;
   classifying the message into a selected one of a plurality of professional importance categories, based on the calculated professional importance score; and
   adjusting display of the message in an electronic message inbox user interface associated with the recipient based on the selected professional importance category and according to the calculated professional importance score.

2. The method of claim 1, wherein the calculating further comprises:
   determining degree of similarity between the sender and the recipient, based on member profile data of the message sender and the message recipient; and
   generating the professional importance score associated with the message, based on the determined degree of similarity.

3. The method of claim 1, wherein the calculating further comprises:
   determining a connection strength between the sender and the recipient associated on the online social networking service; and
   generating the professional importance score associated with the message, based on the determined connection strength.

4. The method of claim 1, wherein the calculating further comprises:
   determining an interaction score indicating a degree of interaction via the online social networking service between the sender and recipient; and
   generating the professional importance score associated with the message, based on the interaction score.

5. The method of claim 1, wherein the calculating further comprises:
   determining a decision maker score associated with the sender; and
   generating the professional importance score associated with the message, based on the decision maker score.

6. The method of claim 1, wherein the calculating further comprises:
   determining that the sender has recently started a job at a particular company, based on member profile data of the sender;
   determining that the recipient has viewed or submitted an application for an online job posting associated with the particular company via the online social networking service; and
   increasing the professional importance score associated with the message.

7. The method of claim 1, wherein the calculating further comprises:

determining that the recipient has posted an online job posting via the online social networking service;
determining that the message is one of a plurality of responses to the online job posting;
calculating a candidate fit score associated with the sender; and
generating the professional importance score associated with the message, based on the candidate fit score.

8. A system comprising:
a processor; and
a memory device holding an instruction set executable on the processor to cause the system to perform operations comprising:
   determining that a recipient corresponding to a member of an online social networking service has received an electronic message from a sender;
   accessing member profile data of the sender and the recipient;
   calculating, based on the accessed member profile data of the sender and the recipient, a professional importance score associated with the message, the calculating comprises:
      accessing calendar data of a meeting planning software, the calendar data being associated with the sender or the recipient;
      determining that there has been a previous meeting or that there is an upcoming meeting between the sender and the recipient based on the accessed calendar data; and
      generating the professional importance score associated with the message based on the determining that there has been the previous meeting or that there is the upcoming meeting between the sender and the recipient;
   classifying the message into a selected one of a plurality of professional importance categories, based on the calculated professional importance score; and
   adjusting display of the message in an electronic message inbox user interface associated with the recipient based on the selected professional importance category and according to the calculated professional importance score.

9. The system of claim 8, wherein the calculating further comprises:
determining degree of similarity between the sender and the recipient, based on member profile data of the message sender and the message recipient; and
generating the professional importance score associated with the message, based on the determined degree of similarity.

10. The system of claim 8, wherein the calculating further comprises:
determining a connection strength between the sender and the recipient associated on the online social networking service; and
generating the professional importance score associated with the message, based on the determined connection strength.

11. The system of claim 8, wherein the calculating further comprises:
determining an interaction score indicating a degree of interaction via the online social networking service between the sender and recipient; and
generating the professional importance score associated with the message, based on the interaction score.

12. The system of claim 8, wherein the calculating further comprises:

determining a decision maker score associated with the sender; and
generating the professional importance score associated with the message; based on the decision maker score.

13. The system of claim 8, wherein the calculating further comprises:
determining that the sender has recently started a job at a particular company, based on member profile data of the sender;
determining that the recipient has viewed or submitted an application for an online job posting associated with the particular company via the online social networking service; and
increasing the professional importance score associated with the message.

14. The system of claim 8, wherein the calculating further comprises:
determining that the recipient has posted an online job posting via the online social networking service;
determining that the message is one of a plurality of responses to the online job posting;
calculating a candidate fit score associated with the sender; and
generating the professional importance score associated with the message, based on the candidate fit score.

15. A non-transitory machine-readable storage medium comprising instructions that, when executed by one or more processors of a machine, cause the machine to perform operations comprising:
determining that a recipient corresponding to a member of an online social networking service has received an electronic message from a sender;
accessing member profile data of the sender and the recipient;
calculating, based on the accessed member profile data of the sender and the recipient, a professional importance score associated with the message, the calculating comprises:
   accessing calendar data of a meeting planning software, the calendar data being associated with the sender or the recipient;
   determining that there has been a previous meeting or that there is an upcoming meeting between the sender and the recipient based on the accessed calendar data; and
   generating the professional importance score associated with the message based on the determining that there has been the previous meeting or that there is the upcoming meeting between the sender and the recipient;
classifying the message into one of a plurality of professional importance categories, based on the calculated professional importance score; and
adjusting display of the message in an electronic message inbox user interface associated with the recipient based on the selected professional importance category and according to the calculated professional importance score.

16. The storage medium of claim 15, wherein the calculating further comprises:
determining a connection strength between the sender and the recipient associated on the online social networking service; and
generating the professional importance score associated with the message, based on the determined connection strength.

17. The storage medium of claim 15, wherein the calculating further comprises:
   determining a decision maker score associated with the sender; and
   generating the professional importance score associated with the message, based on the decision maker score.

18. The storage medium of claim 15, wherein the calculating further comprises:
   determining that the sender has recently started a job at a particular company, based on member profile data of the sender;
   determining that the recipient has viewed or submitted an application for an online job posting associated with the particular company via the online social networking service; and
   increasing the professional importance score associated with the message.

19. The storage medium of claim 15, wherein the calculating further comprises:
   determining that the recipient has posted an online job posting via the online social networking service;
   determining that the message is one of a plurality of responses to the online job posting;
   calculating a candidate fit score associated with the sender; and
   generating the professional importance score associated with the message, based on the candidate fit score.

\* \* \* \* \*

UNITED STATES PATENT AND TRADEMARK OFFICE
CERTIFICATE OF CORRECTION

PATENT NO. : 10,505,885 B2  
APPLICATION NO. : 14/938317  
DATED : December 10, 2019  
INVENTOR(S) : Lawrence Yuan Page 1 of 1

It is certified that error appears in the above-identified patent and that said Letters Patent is hereby corrected as shown below:

On the Title Page

Item (71), in "Applicant", in Column 1, Lines 1-2, delete "LinkedIn Corporation, Mountain View, CA" and insert --Microsoft Technology Licensing, LLC, Redmond, WA-- therefor In the Claims In Column 34, Line 4, in Claim 12, delete "message;" and insert --message,-- therefor Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*